(12) United States Patent
Zhao

(10) Patent No.: US 11,398,785 B2
(45) Date of Patent: Jul. 26, 2022

(54) POSITION DETECTION AND MONITORING

(71) Applicant: Infineon Technologies Austria AG, Villach (AT)

(72) Inventor: Tao Zhao, Redondo Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/031,374

(22) Filed: Sep. 24, 2020

(65) Prior Publication Data

US 2022/0094285 A1  Mar. 24, 2022

(51) Int. Cl.
- *H02P 6/185* (2016.01)
- *H02P 6/20* (2016.01)
- *H02K 29/08* (2006.01)
- *H02P 6/08* (2016.01)

(52) U.S. Cl.
CPC ............ *H02P 6/185* (2013.01); *H02K 29/08* (2013.01); *H02P 6/08* (2013.01); *H02P 6/20* (2013.01)

(58) Field of Classification Search
CPC ... H02P 6/185; H02P 6/20; H02P 6/08; H02K 29/08
USPC ................... 318/400.33, 400.32, 400.01, 700
See application file for complete search history.

(56) References Cited

U.S. PATENT DOCUMENTS

| | | | | |
|---|---|---|---|---|
| 5,859,518 | A * | 1/1999 | Vitunic | H02P 25/089 318/400.15 |
| 7,362,062 | B2 * | 4/2008 | Schneider | H02P 6/182 318/254.1 |
| 10,236,808 | B2 * | 3/2019 | Murray | H02P 6/185 |
| 10,742,143 | B2 * | 8/2020 | Roemmelmayer | H02P 6/20 |
| 2013/0106333 | A1 | 5/2013 | Durkee | |
| 2019/0305697 | A1 | 10/2019 | Slater | |

FOREIGN PATENT DOCUMENTS

DE  102014106667 A1  4/2015

OTHER PUBLICATIONS

Extended Search Report, EP 21198174.1, dated Feb. 3, 2022, pp. 1-7.

* cited by examiner

*Primary Examiner* — David Luo

(74) *Attorney, Agent, or Firm* — Armis IP Law, LLC

(57) ABSTRACT

An apparatus includes a controller that controls a motor including multiple motor windings. To determine motor position, the controller is operative to supply current through the multiple windings of the motor. The multiple windings are coupled to a rotor of the motor. While supplying the current to the motor windings, the controller monitors a magnitude of the current supplied through the windings of the motor. Based on measured inductance associated with the motor as determined from the monitored current through the windings, the controller determines a (rotational) position of the rotor.

32 Claims, 15 Drawing Sheets

POSITION DETECTION AND MONITORING

BACKGROUND

Sensorless motor control is a preferred choice for implementing in cost-sensitive consumer & industrial three-phase BLDC/PMSM (Brushless DC Motor/Permanent Magnet Synchronous Motor) motor drives as such technology eliminates costly mechanical rotor sensor(s). Sensorless motor control also plays a role in highly-reliable solutions as a redundant substitution of sensored motor control in case the rotor sensor(s) fails. Robust sensorless motor startup, especially at heavy load or dynamic load, is challenging. It is desirable to determine rotor position without having to reverse the rotor at startup. Knowing the position of the rotor at startup enables one to achieve maximum initial startup torque.

One existing solution is to pre-position a respective motor rotor to a known position (aka. parking) before startup, then open-loop start the motor to certain speed before transition to close-loop control. Pre-positioning may cause the rotor to briefly reverse rotate backwards. It also is noted that a very large and unrealistic motor current is needed to park the rotor to a known position at heavy load (such as power drill motor control applications). Reversing the position of the motor and having to supply high current is undesirable.

Another existing solution of initial rotor position detection at startup is to energize two phases of the motor for a certain time with known voltage and measure the responding motor current, repeating for six times by alternate phases and current directions. In this way, an orientation of the motor rotor and general sector in which the position resides can be determined by comparisons of the current magnitudes, however the rotor position accuracy is very poor.

BRIEF DESCRIPTION

This disclosure includes the observation that conventional techniques of monitoring current through a motor winding suffer from deficiencies. For example, as previously discussed, it is often difficult but desirable to more precisely accurately sense a position of a motor rotor.

Embodiments herein include novel ways of improving an accuracy of determining a position of a motor rotor and state of a motor.

More specifically, embodiments herein include an apparatus and/or system including a controller. The controller is operative to supply and control current through multiple windings of a motor. The multiple windings are coupled to a rotor of the motor. While supplying the current to the motor windings, the controller monitors a magnitude of the current supplied through the windings of the motor. Based on measured inductance derived from monitored current, the controller derives a position of the rotor.

In one embodiment, rotor position detection as described herein includes detecting the rotor permanent magnet position associated with the motor. If motor pole pair number is 1, the position of the rotor is the same as the position of the corresponding shaft of the motor. If motor pole pair number is 2 or more, the shaft position and rotor position are not the same.

In accordance with further example embodiments, the controller supplies the current through the multiple windings and determines the position of the rotor (such as position of the rotor permanent magnet associated with the motor) while the rotor of the motor is not rotating. In one embodiment, the magnitude and/or period of supplying the current to the windings is sufficiently small such that the current does not cause the rotor of the motor to rotate while determining position.

Further embodiments herein include, via the controller, supplying the current, monitoring the magnitude, and deriving the position of the rotor while the rotor is rotating. In one embodiment, a rate of the rotating rotor is below threshold value.

In accordance with still further embodiments, a frequency of the current supplied through the windings is at least two times greater than a rotational frequency of the rotor.

Still further embodiments herein include, via the controller, controlling supply of the current through multiple windings of the motor based on space vector modulation. In one embodiment, the current supplied the multiple windings is sinusoidal in accordance with the space vector modulation.

In further example embodiments, the controller applies one or more transformation function to convert the monitored magnitude of the current through the windings of the motor into an inductance function; transformation includes application of one or more of a Clarke transformation, Cartesian to Polar coordinates transformation, etc., to produce the inductance function.

A magnitude of the inductance function generated by the controller varies over time. In one embodiment, the controller identifies (calculates) the position of the rotor based on a minimum inductance value of the generated inductance function.

In still further example embodiments, the controller derives an inductance value that varies over time based on the magnitude of current supplied through the windings. The controller then determines the position of the rotor based on the magnitude of the inductance value in a given control cycle of supplying the current through the motor windings.

As previously discussed, embodiments herein are useful over conventional techniques. For example, embodiments herein include more accurately determining a position of a motor rotor.

These and other more specific embodiments are disclosed in more detail below.

Note that although embodiments as discussed herein are applicable to current monitoring and motor control, the concepts disclosed herein may be advantageously applied in any suitable application.

Note further that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: supply current through multiple windings of a motor, the multiple windings operative to rotate a rotor of the motor; monitor a magnitude of the current supplied through the windings of the motor; and determine a position of the rotor from the monitored magnitude of current supplied through the windings.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of detecting the position of a motor rotor. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
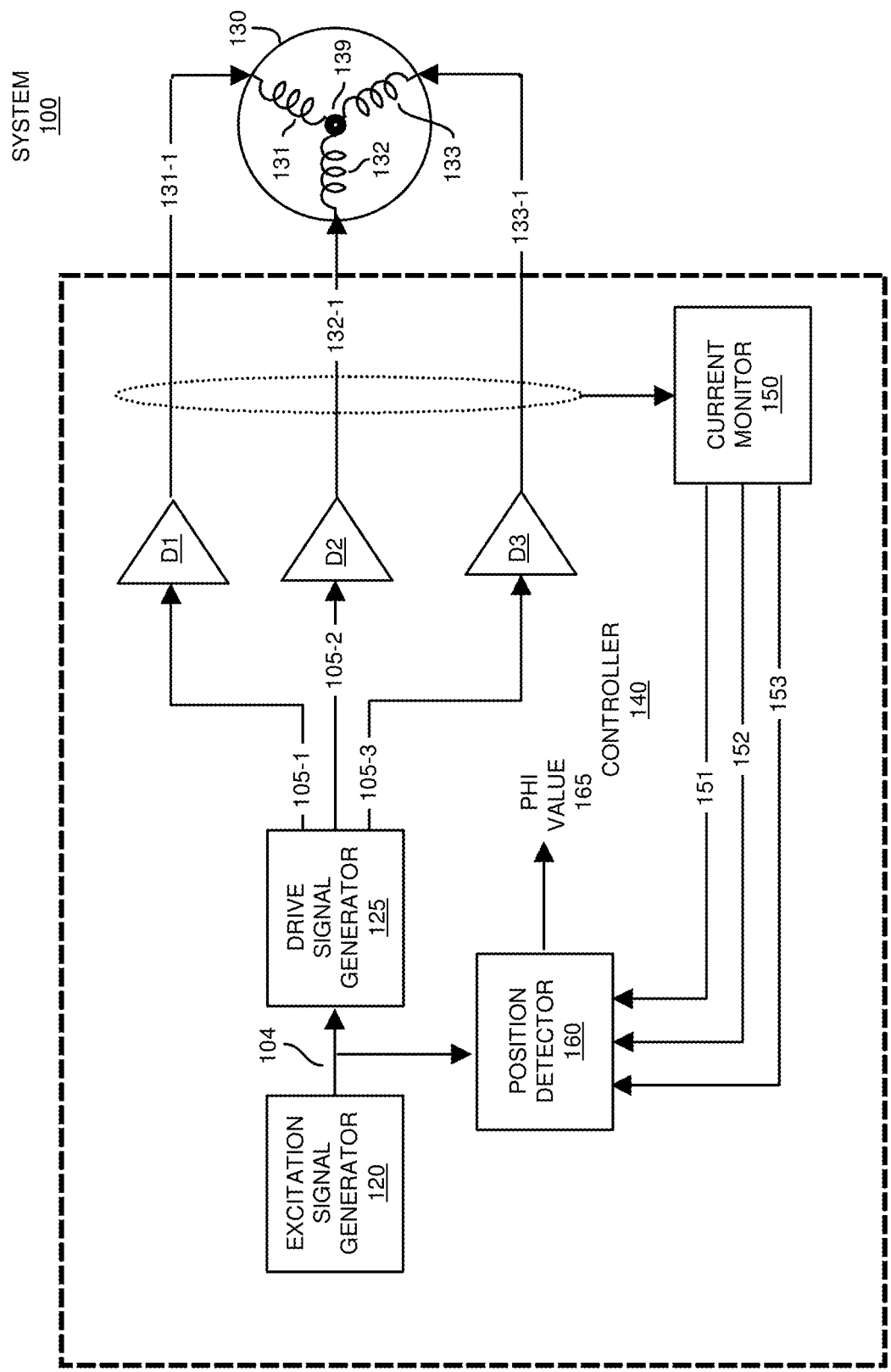
FIG. 1 is an example general diagram of a position detection and control system according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Note that embodiments herein can be implemented in any suitable motor such as a three phase motor control for BLDC (Brushless DC Motor) and PMSM (Permanent Magnet Synchronous Motor), where initial rotor position detection is desired, such as for the control algorithms of sensor-less or sensor FOC (Field-Oriented Control), sensor-less or sensor BLDC block commutation control, sensor-less or sensor DTC (Direct Torque Control), etc.

In one non-limiting example embodiment, the position detection system as described herein provides rotor position detection in a BLDC/PMSM motor or other suitable motor application, either in standstill or low-speed (low-speed means much slower than the excitation voltage frequency). The position detection system provides high rotor or rotor position accuracy and can be implemented in a manner to provide continuous and exact rotor position information, especially if using accurate current sensing and low deadtime of inverter.

As further discussed herein, in one embodiment, to achieve high performance, the excitation voltage (or current) of SVM (Space Voltage Modulation) are implemented in accordance with a low magnitude and high frequency, so the motor vibration during rotor position detection are minimized. Further, the time to determine position is relatively quick such as within one or more periods associated with application of the excitation voltage (current).

Thus, embodiments herein include an apparatus includes a controller that controls a motor including multiple motor windings. To determine motor position, the controller is operative to supply current through the windings in accordance with an excitation voltage/current. The multiple windings are operative to control movement of a rotor of the motor. While supplying the current (in accordance with excitation signals) to the motor windings, the controller monitors a magnitude of the current supplied through the windings of the motor. Based on measured inductance associated with the motor as determined from the monitored current through the windings in view of the excitation signals (i.e., drive signals), the controller determines a (rotational) position of the motor rotor, such as while the motor rotor is stationary or rotating.

Now, more specifically, FIG. 1 is an example general diagram of a motor position detection and control system according to embodiments herein.

In this general example embodiment, the system 100 (such as motor system or other suitable entity) includes controller 140 and motor 130.

As shown, controller 140 includes excitation signal generator 120, drive signal generator 125, winding drivers D1, D2, and D3, etc., current monitor 150, and position detector 160.

Motor 130 includes multiple windings such as winding 131 (U), winding 132 (V), and winding 133 (W). Note that the motor 130 can be configured to include any number of windings.

As further shown, the motor 130 includes a respective rotating rotor 139 (supporting clockwise or counterclockwise rotation). The position of the rotating rotor 139 varies (e.g., the rotor rotates) in response to the controller 140 supplying sufficient drive current at the appropriate frequency through the respective windings 131, 132, and 133 of the motor 130 via the drivers D1, D2, and D3 above a threshold value.

For example, via the excitation signal generator 120, the controller 140 produces corresponding control signals 104 supplied to the drive signal generator 125. Based on the received signals 104, the drive signal generator 125 produces control signals 105 that drives respective drivers D1, D2, D3.

More specifically, the drive signal generator 125 produces control signal 105-1 that controls operation of driver D1; the drive signal generator 125 produces control signal 105-2 that controls operation of driver D2; the drive signal generator 125 produces control signal 105-3 the controls operation of driver D3.

Based on a setting of the control signal 105-1, the driver D1 supplies a desired output current 131-1 to the winding 131 of the motor 130.

Based on a setting of the control signal 105-2, the driver D2 supplies a desired output current 132-1 to the winding 132 the motor 130.

Based on a setting of the control signal 105-3, the driver D3 supplies a desired output current 133-1 to the winding 133 of the motor 130.

In one embodiment, while supplying current 131-1, 132-1, and 133-1, to the respective motor windings 131, 132, and 133, as its name suggests, the current monitor 150 monitors a magnitude of current 131-1, current 132-1, and current 133-1.

The current monitor 150 provides feedback signals to the position detector 160 indicating a respective amount of current flowing through each of the windings over time. For example, the current monitor 150 produces the feedback signal 151 indicating a magnitude of the current 131-1 flowing through winding 131 over time; the current monitor 150 produces the feedback signal 152 indicating a magnitude of the current 132-1 flowing through winding 132 over time; the current monitor 150 produces the feedback signal 153 indicating a magnitude of the current 133-1 flowing through winding 133 over time.

In one nonlimiting example embodiment, based on measured inductance attributes (such as reactance inductance or other suitable parameter) of the motor windings such as determined based on the feedback signals 151, 152, and 153, and also in view of the excitation signals 104 supplied to the position detector 160, the position detector 160 derives a position (such as phi value 165 or φ indicating angular position) of the rotor 139 from the monitored/detected magnitude of current 151-1, 151-2, and 151-3 supplied through the respective windings 131, 132, and 133.

In one embodiment, as its name suggests, the position detector 160 associated with controller 140 determines the angular position (as indicated by phi value 165) of the rotor 139 while the rotor of the motor is not rotating or rotating.

In one embodiment, the controller 140 supplies the current 131-1, 132-1, 133-1 to the windings, monitors the magnitude of the current via feedback signals 151, 152, and 153, and derives the position of the rotor 139 while the rotor 139 is rotating. In one embodiment, the position detector 160 determines a position of the rotor 139 while the rotor 139 is rotating at a rate greater than zero but below a threshold value. In other words, embodiments herein such as position detector 160 and corresponding methods can be implemented to determine a position of the rotor 139 of motor 130 even if the motor 130 happens to be physically rotating.

In yet further example embodiments, note that the magnitude of the current 131-1, 132-1, and 133-1 supplied to the respective windings 131, 132, and 133, is sufficiently low and/or the frequency of the current is sufficiently high that the current does not cause the rotor 139 (or rotor) of the motor 130 to rotate. Thus, embodiments herein supplying test current (such as current 131-1, 132-1, and 133-1) through the respective windings 131, 132, and 133 to determine the position of the rotor 139.

In accordance with still further embodiments, note that a frequency of the current supplied through the windings 131, 132, and 133 is greater than a rotational frequency of the rotor 139.

Figure 2:
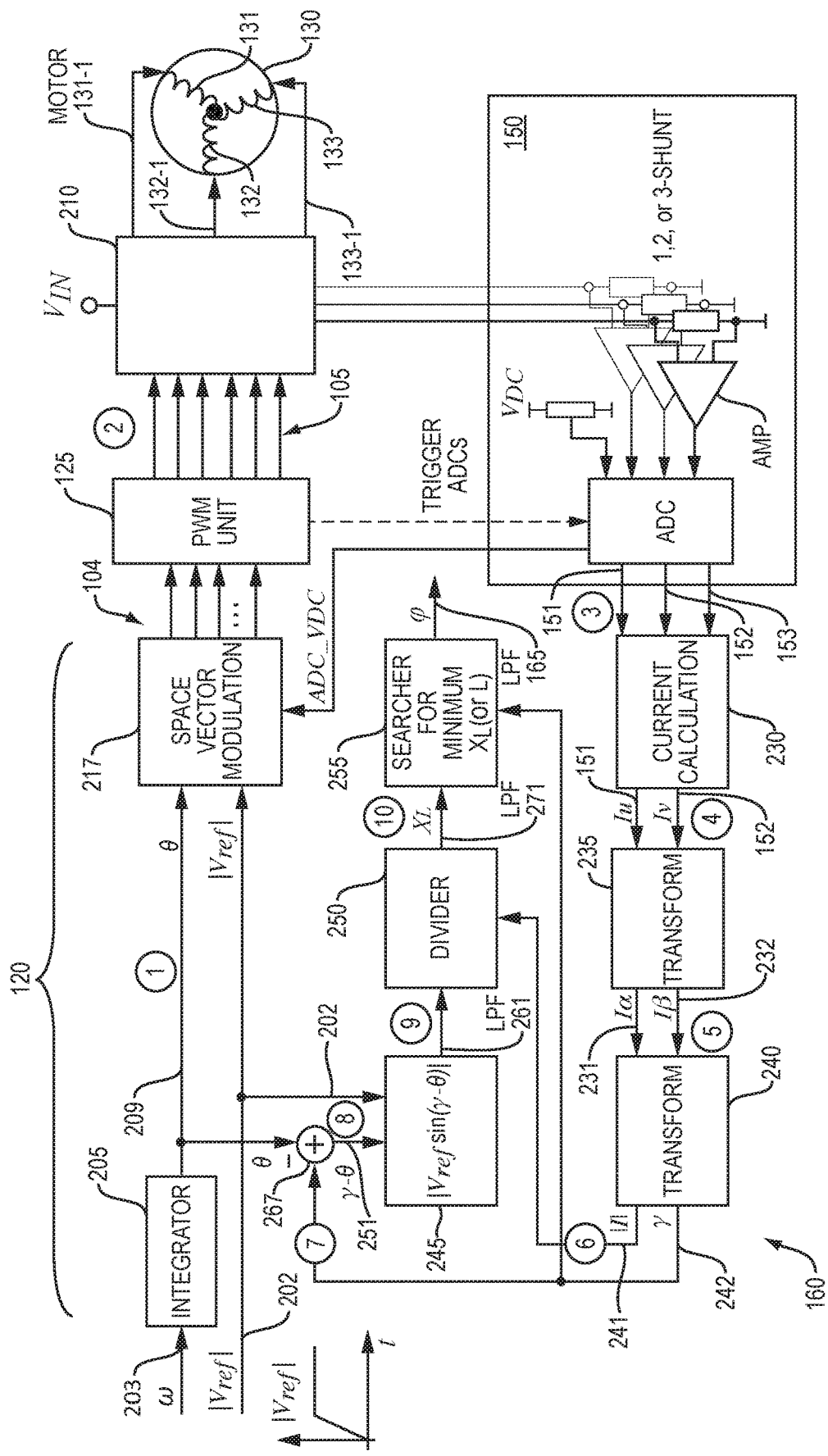
FIG. 2 is an example detailed diagram of a position detection and control system according to embodiments herein.

FIG. 2 is an example detailed diagram of a position detection and control system according to embodiments herein.

Embodiments herein include the position detection system (such as position detector 160) to determine initial rotor position associated with the motor 130. As previously discussed, by way of non-limiting example embodiment, the motor 130 can be any suitable type such as a BLDC motor, PMSM motor, etc.

In this example embodiment as shown in FIG. 2, a rotating space voltage vector (i.e., excitation voltage) is applied to the motor phases with a Space Vector Modulation (SVM) technique, and the current will flow through the motor phases, which are measured by 1, 2, or 3-shunt current sensing resistors.

Note that any technique can be used to monitor and detect the magnitude of current supplied by each of the drivers to the windings 131, 123, and 133. For example, other ways of motor phase current sensing such as using motor phase in-line shunt resistors, Hall sensors, current transducers (e.g.: LEM current sensors), and so on, can be used to sense current and determine the initial rotor position as well.

In one embodiment, a Clarke Transform and a Cartesian to Polar Transform are implemented to convert the current ADC values (as signals 151, 152, and 153) representing detected current 131-1, 132-1 and 133-1 through windings 131, 132, and 133. The results of applying transforms are used to calculate the absolute value of $V_{ref}\sin(\gamma-\theta)$, from which the inductive reactance of stator winding $X_L$ (signal 271) is calculated by a divider module 250.

In one embodiment, the above process as captured in FIG. 2 is executed continuously (such as at least multiple cycles) at certain measurement/test frequencies of producing current 131-1, 132-1, and 133-1, and a search of the minimum value of inductance function $X_L$ (or inductance L) such as via analyzer module 255. Testing can be implemented until the initial rotor position φ (signal 165 indicating angle value) is detected and known. After determining rotor (rotor 139) position, the controller 140 operates the motor 130 in accordance with conventional BLDC/PMSM algorithms such as BLDC block commutation, FOC, DTC, and etc.

TABLE 1

Mathematical transformations for proposed rotor position detection

| Transformation | Equations[Note 1] |
|---|---|
| Clarke Transform (module 230 and module 235) | $I_\alpha = I_u$<br>$I_\beta = (I_u + 2I_v)/\sqrt{3}$<br>$(I_u + I_v + I_w = 0)$ |
| Cartesian to Polar Transform of current, and Subtraction of Angles (module 240) | $\|I\| = \sqrt{I_\alpha^2 + I_\beta^2}$<br>$\gamma = \arctan\left(\dfrac{I_\beta}{I_\alpha}\right)$<br>$\gamma - \theta$ |
| Divider (module 250) | $X_L = \dfrac{\|V\sin(\gamma-\theta)\|}{\|I\|}$ |
| Integrator (module 205) | $\theta = \int \omega DT$ |

Note further that the optional LPFs (Low-Pass Filters) shown in FIG. 2 can be any order. For simplicity, the system 100 can be implemented with one or more a first-order LPF with unity gain such as:

$$y[k] = y[k-1] + \frac{1}{2^N}\{x[k] - y[k-1]\} \quad (13)$$

where:
y[k] represents a current cycle filter output.
y[k−1] represents a last cycle filter output.
x[k] represents a current cycle filter input.
N represents an integer which affects the LPF's cut-off frequency, and N=1, 2, 3, . . . .

In this example embodiment, the signal 203 (a.k.a., omega) represents a test setting of applying sinusoidal current to the motor rotor 139. In one embodiment, the signal 202 is a constant selected for the position detector test.

Integrator 205 produces signal 209 (theta or ramp signal 209 ramping between 0 and 360 degrees) from the signal 203 (omega).

Space vector modulation module 217 receives signal 209 and signal 202 and produces excitation signals 104 to control application of current 131-1, 132-1, and 133-1 supplied to motor 130. The drive signal generator 125 uses the signals 104 to produce control signals 105 applied to the inverter 210 and corresponding drivers D1, D2, D3.

In accordance with the control signals 105, the driver D1 in the inverter 210 controls and supplies current 131-1 to winding 131; the driver D2 in the inverter 210 controls and supplies current 132-1 to winding 132; the driver D3 in the inverter 210 controls and supplies current 133-1 to winding 133.

As further shown, current monitor 150 monitors a magnitude of the current 131-1, 132-1 and 133-1 through each of the windings 131, 132, and 133. The current monitor 150 supplies signal 151 (representing a detected magnitude of current 131-1 through winding 131), signal 151 (representing a magnitude of current 132-1 through winding 132), and signal 153 (representing a magnitude of current 133-1 through winding 133) to the module 230.

Module 230 outputs selected signals 151 and 152 to the module 235.

Module 235 receives the signals 151 and 152. In one embodiment, the module 235 applies a Clarke transform (or other suitable transform) to the received signals 151 and 152 to produce the respective signal 231 and 232.

Module 235 outputs the signals 231 and 232 to the module 240. In one embodiment, the module 240 applies a Cartesian to polar transform (or other suitable transform) to the received signals 231 and 232 to produce signals 241 and 242. Module 240 outputs the signal 241 to the module 250. The module 240 outputs the signal 242 to the module 255 and the summer 267.

As further shown, the summer 267 receives signal 242 and signal 209 and produces a respective signal 251 representing the difference between the signal 242 and the signal 209. Summer 267 outputs the signal 251 to the module 245.

Module 245 receives the signal 251 and the signal 202 and produces a respective signal 261.

Module 250 receives signal 261 and signal 241 and produces respective signal 271. Module 251 outputs the signal 271 to the analyzer module 255.

Module 255 receives the signal 271 and signal 242. As further discussed herein, the module 255 identifies the minimum value associated with signal 271 in order to identify the position of the rotor 139 as indicated by the signal 165.

Details of the above mentioned signals and processing associated with each of the modules are further shown in the drawings and are discussed in more detail below.

Figure 3:
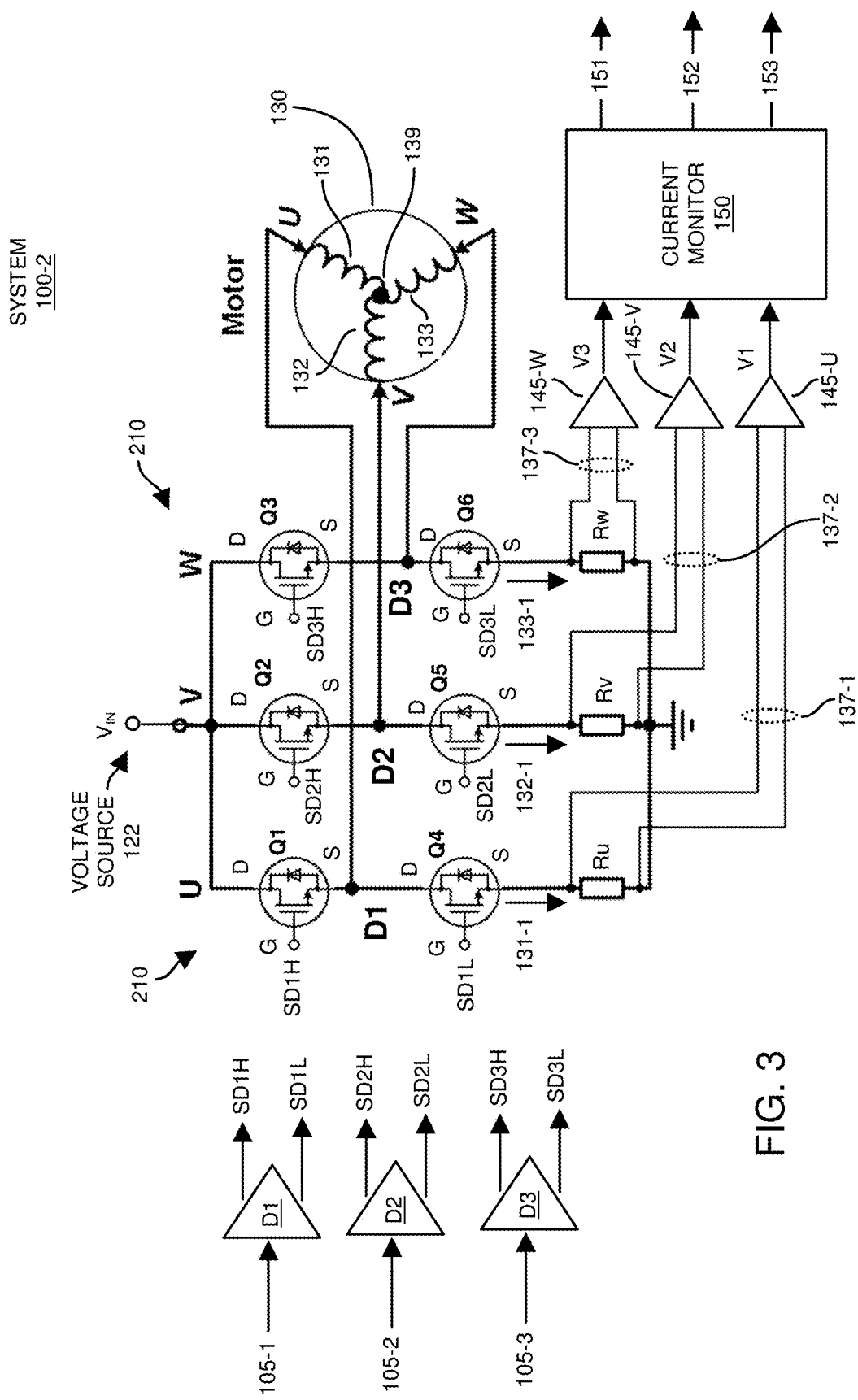
FIG. 3 is an example diagram illustrating a motor winding driver according to embodiments herein.

FIG. 3 is an example diagram illustrating a motor winding driver according to embodiments herein.

In this example embodiment, the system 100 includes inverter 210 (such as including drivers D1, D2, D3), motor 130, and resistive paths Ru, Rv, and Rw to monitor current flow. Inverter 210 includes switches Q1, Q2, Q3, Q4, Q5, and Q6.

As shown, driver D1 includes switches Q1 (such as high side switch circuitry) and Q4 (such as low side switch circuitry) that control current through winding 131; driver D2 includes switches Q2 and Q5 that control current through winding 132; driver D3 includes switches Q3 and Q6 that control current through winding 133.

More specifically, driver D1 includes a combination of switch Q1, switch Q4, and resistive path R1 form a first series path between voltage source Vin (supply voltage such as 5 VDC or other suitable value) and ground; driver D2 includes a combination of switch Q2, switch Q5, and resistive path R2 form a second series path between voltage source Vin and ground; driver D3 includes a combination of switch Q3, switch Q6, and resistive path R3 form a third series path between voltage source Vin and ground.

As previously discussed, motor 130 includes three windings such as motor winding 131, motor winding 132, and motor winding 133. Note that the sum of current 131-1, 132-1, and 133-1 through all windings 131, 132, and 133 is zero. Hence, if a magnitude of currents through two of the windings of motor 130 is known, the current in the third winding can be determined from the first two winding currents.

Respective first nodes of all three windings 131, 132, and 133 are connected together at a common node of the motor 130.

Each of the windings is also connected to a respective series circuit path associated with the inverter 210. For example, a second node of winding 131 is connected to the source node (S) of switch Q1 and the drain node (D) of the switch Q4; a second node of winding 132 is connected to the source node (S) of switch Q2 and the drain node (D) of the switch Q5; a second node of winding 133 is connected to the source node (S) of switch Q3 and the drain node (D) of the switch Q6.

In yet further example embodiments, via generation of the control signals 105 applied to respective switches Q1-Q6, the controller 140 controls an amount of sinusoidal, out of phase current supplied to each of the windings.

For example, driver D1 receives control signal 105-1 and produces signals SD1H (that drives the gate of switch Q1) and SD1L (that drives the gate of switch Q4) based on control signal 105-1. For example, when the control signal 105-1 is logic high, the driver produces: i) SD1H to turn switch Q1 to an ON state (i.e., low impedance path or short circuit), and ii) SD1L to turn switch Q4 to an OFF state (i.e., high impedance path or open circuit). When the control signal 105-1 is logic low, the driver produces: i) SD1H to turn switch Q1 to an OFF state (high impedance path or open circuit), and ii) SD1L to turn switch Q4 to an ON state (low impedance path or short circuit). There is a dead time between turning on either of the switches Q1 and Q4.

Driver D2 receives control signal 105-2 and produces signals SD2H (that drives the gate of switch Q2) and SD2L (that drives the gate of switch Q4) based on control signal 105-2. For example, when the control signal 105-2 is logic high, the driver produces: i) SD2H to turn switch Q2 to an ON state (low impedance path or short circuit), and ii) SD2L to turn switch Q5 to an OFF state (high impedance path or open circuit). When the control signal 105-2 is logic low, the driver produces: i) SD2H to turn switch Q2 to an OFF state (high impedance path or open circuit), and ii) SD2L to turn switch Q5 to an ON state (low impedance path or short circuit). There is a dead time between turning on either of the switches Q2 and Q5.

Driver D3 receives control signal 105-3 and produces signals SD3H (that drives the gate of switch Q3) and SD3L (that drives the gate of switch Q6) based on control signal 105-3. For example, when the control signal 105-3 is logic high, the driver produces: i) SD3H to turn switch Q3 to an ON state (low impedance path or short circuit), and ii) SD3L to turn switch Q6 to an OFF state (high impedance path or open circuit). When the control signal 105-3 is logic low, the driver produces: i) SD3H to turn switch Q3 to an OFF state (high impedance path or open circuit), and ii) SD3L to turn switch Q6 to an ON state (low impedance path or short circuit). There is a dead time between turning on either of the switches Q3 and Q6.

Current through the respective resistors R1, R2, and R3 produces a respective voltage indicative of an amount of current through each winding. In one embodiment, the current monitor 150 detects a magnitude of the respective winding current for a given winding when a corresponding low side switch is activated to an ON state.

For example, when switch Q4 is activated to an ON state, current 131-1 flows through the resistor Ru producing voltage V1 monitored by the monitor circuit 150. In such an instance, the voltage V1 indicates a magnitude of the current 131-1 flowing through the winding 131.

When switch Q5 is activated to an ON state, current 132-1 flows through the resistor Rv producing voltage V2 monitored by the monitor circuit 150. In such an instance, the voltage V2 indicates a magnitude of the current 132-1 flowing through the winding 132.

When switch Q6 is activated to an ON state, current 133-1 flows through the resistor Rw producing voltage V3 monitored by the monitor circuit 150. In such an instance, the voltage V3 indicates a magnitude of the current 133-1 flowing through the winding 133.

Via output voltages V1, V2, and V3, the current monitor 150 determines respective magnitudes of current 131-1, 132-1, and 133-1 through each of the respective multiple windings 131, 132, and 133 of motor 130. The current through the respective winding is equal to the voltage across the resistor divided by the resistance associated with the resistor.

Based on monitoring of the voltage V1, V2, and V3 and the detected current, the current monitor 150 produces feedback signals 151, 152, and 153. In this example embodiment, the feedback 151 signal associated with winding 131 indicates a magnitude of the sinusoidal current 131-1 through the winding 131; the feedback signal 152 associated with winding 132 indicates a magnitude of the sinusoidal current 132-1 through the winding 132; the feedback signal 153 associated with winding 133 indicates a magnitude of the sinusoidal current 133-1 through the winding 133.

Figure 4:
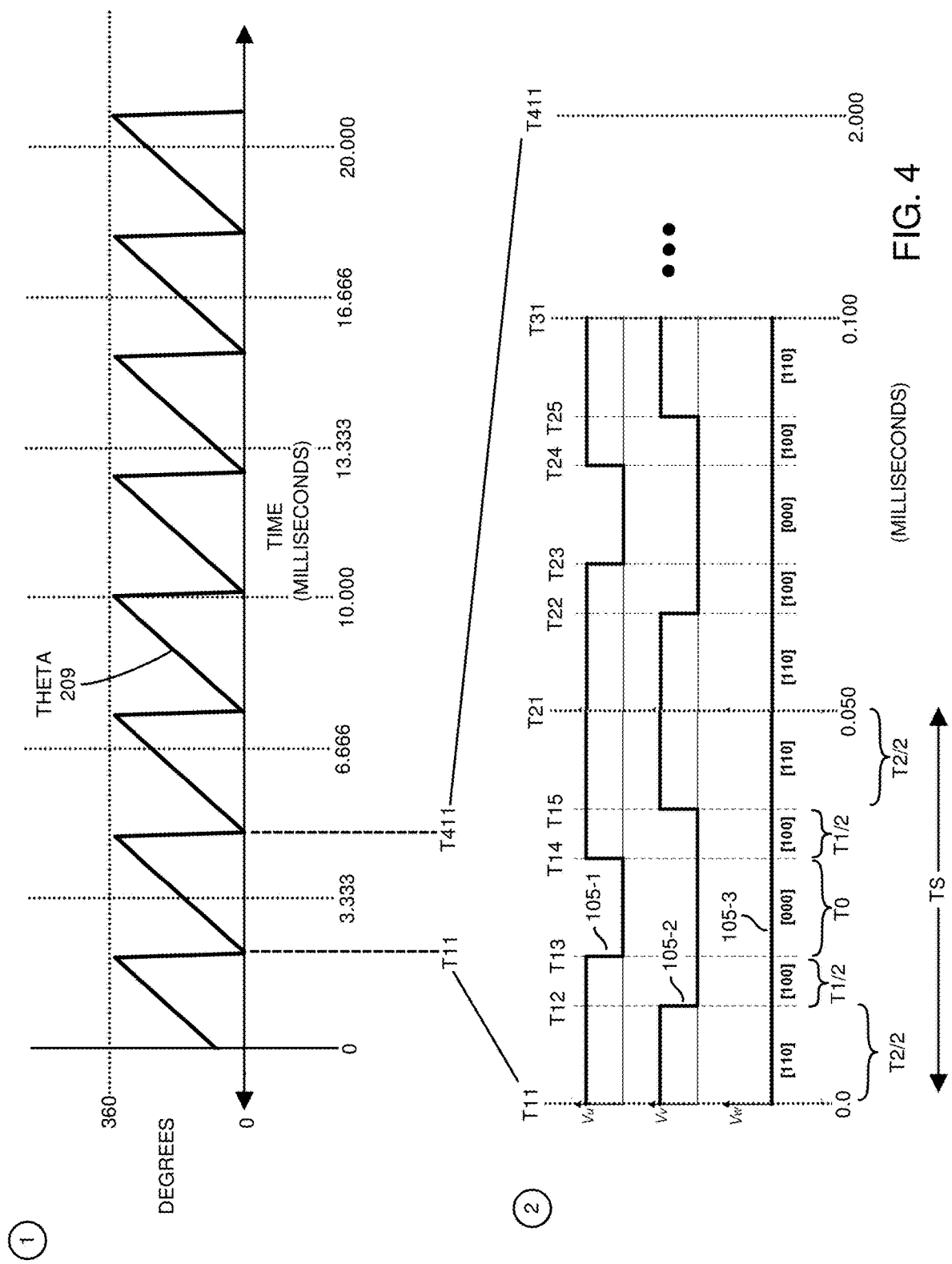
FIG. 4 is an example timing diagram illustrating winding drive signals according to embodiments herein.

FIG. 4 is an example timing diagram illustrating winding drive signals according to embodiments herein.

Figure 5:
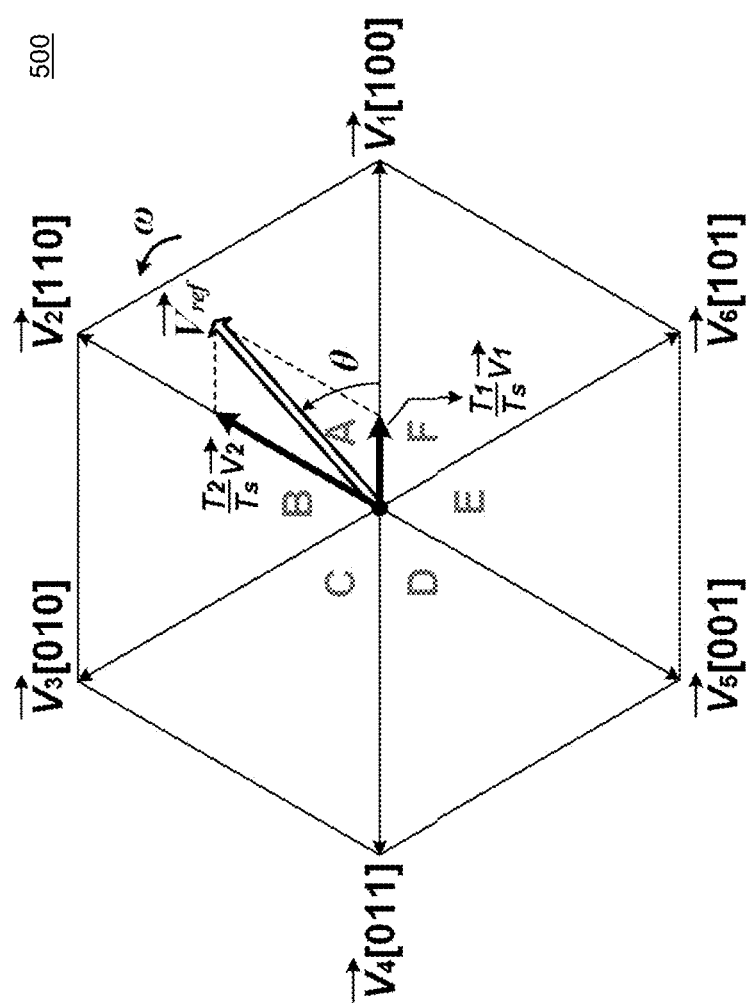
FIG. 5 is an example diagram illustrating implementation of space vector modulation techniques according to embodiments herein.

Still further embodiments herein include, via the controller 140, controlling supply of the sinusoidal current 131-1, 132-1, and 133-1 through multiple respective windings 131, 132, and 133 of the motor 130 based on space vector modulation (such as the example of FIG. 5). In one embodiment, each of the currents 131-1, 132-1, and 133-1 supplied to the respective windings is sinusoidal in accordance with the modulation.

Embodiments herein include choosing a desired setting/value for signal 202 (such as Vref or |Vref|) as well as omega signal 203. As previously discussed, the integrator 205 produces signal 209 (such as theta or test angle) inputted to the space vector modulation model 217. Space vector modulation module 217 also receives the signal 202 (|Vref|).

Based on such input signals 202 and 209, the space vector modulation model 217 produces the excitation signals 104 supplied to the drive signal generator 125. In accordance with the received input from the space vector modulation module 217, the drive signal generator 125 produces controls signals 105-1, 105-2, and 105-3 to control the flow of current 131-1, 132-1, and 133-1 supplied to the windings 131, 132, and 133 of motor 130.

In one embodiment, for each omega cycle (such as 2 milliseconds or other suitable value in duration) and ramping of theta 209 between 0 and 360 degrees at a frequency of omega 203 divided by 2 pi, assuming that Ts=50 microseconds, the drive signal generator 125 implements/repeats 40 instances of Ts control cycles of control signals 105 to control the respective current through windings 131, 132, and 133. The bottom portion of FIG. 4 illustrates 2 of the 40 sample cycles (Ts) in a row between T11 and T41.

In one embodiment, as further discussed herein, the modulation of control signals in FIG. 4 causes a sinusoidal flow of test current through the windings 131, 132, and 133 so that the position detection system 160 can determine a respective position of the rotor 139.

Note that the drive signal generator 125 repeats the application of control signals 105 for each of the cycles such as between T11 and T411, between T411 and time T811, between time T811 and T1211, and so on.

As further shown in this example embodiment, for each sample cycle Ts (such as between T11 and T21, between T21 and T31, and so on), the drive signal generator 125 produces the control signal 105-3 to be a logic lo in which the switch Q6 is set to an ON state.

Additionally, for each sample cycle Ts, the drive signal generator 125 activates the high side switch circuitry Q1 to an ON state and deactivates the low side switch circuitry Q4 to an OFF state between time T11 and T13 as well as between time T14 and T21 (total duration T2/2+T1/2+T1/2+T2/2=T1+T2) of a respective cycle. As further shown, for each sample cycle Ts, the drive signal generator 125 activates the low side switch circuitry Q4 to an ON state and deactivates the high side switch circuitry Q1 to an OFF state between time T13 and T14 (duration T0).

Yet further, for each sample cycle Ts, the drive signal generator 125 activates the high side switch circuitry Q2 to an ON state and deactivates the low side switch circuitry Q5 to an OFF state between time T11 and T12 as well as between time T15 and T21 (total duration T2/2+T2/2=T2). For each sample cycle Ts, the drive signal generator 125 activates the low side switch circuitry Q5 to an ON state and deactivates the high side switch circuitry Q2 to an OFF state between time T12 and T15 (duration T0+T1/2+T1/2=T0+T1).

Additional details associated with the space vector modulation is shown in FIG. 5.

FIG. 5 is an example diagram illustrating implementation of space vector modulation according to embodiments herein.

As previously discussed, space vector modulation (SVM) is used to control the PWM (drive signal generator 125) for the inverter 210 switching devices to create 3-phase sinusoidal current supplied to the motor windings 131, 132, and 133. An example of the reference vector approximation in SVM is shown in space vector diagram 500 (a regular hexagon) in FIG. 5.

In this example embodiment, the excitation voltage vector (in sector A as an example in FIG. 5) with magnitude of |Vref|(a.k.a., signal 202) and as angle of θ (a.k.a., signal 209) is revolving at angular speed w (signal 203). This excitation voltage applied to the motor windings are with low magnitude |Vref| and high speed w, such that the motor vibration during rotor position detection is minimized, and the position detection time is short such as only a few periods of the excitation voltage.

Figure 6:
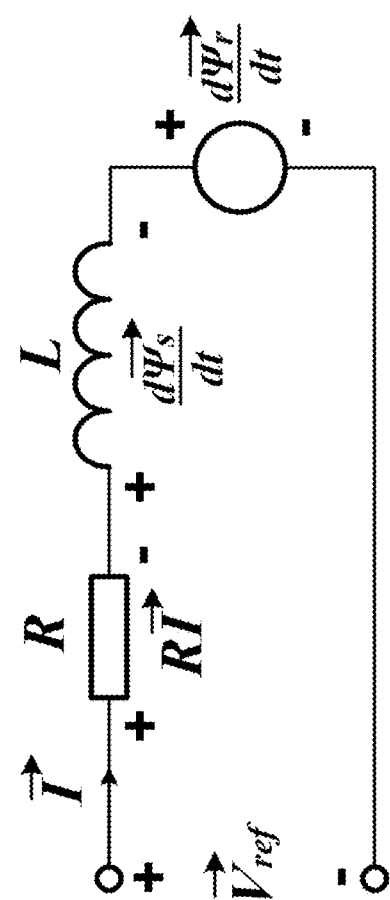
FIG. 6 is an example diagram illustrating motor modeling according to embodiments herein.

FIG. 6 is an example diagram illustrating motor modeling according to embodiments herein.

The equivalent circuit of the motor 130 and winding is shown in FIG. 6. The motor equation is as follows:

$$\vec{V}_{ref} = \vec{R I} + \frac{d\vec{\Psi}_s}{dt} + \frac{d\vec{\Psi}_r}{dt} \quad \text{(eq. 1)}$$

Equation (1) can be rewritten as the following Equation (2) in the stationary polar coordinate system:

$$|V_{ref}| \cdot e^{j\theta} = \underbrace{R|I| \cdot e^{j\gamma}}_{R \vec{I}} + \underbrace{L\frac{d|I|}{dt} \cdot e^{j\gamma} + \omega_i L|I| \cdot e^{j(\gamma+\frac{\pi}{2})}}_{\frac{d\vec{\Psi}_s}{dt}} + \underbrace{\omega_r|\Psi_r| \cdot e^{j(\varphi+\frac{\pi}{2})}}_{\frac{d\vec{\Psi}_r}{dt}} \quad \text{(eq. 2)}$$

where:

R represents stator winding resistance per phase.

L represents stator winding inductance per phase.

$\vec{V}_{ref}$ represents stator voltage space vector, with magnitude $|V_{ref}|=\sqrt{V_\alpha^2+V_\beta^2}$ and angle $$\theta = \arctan\left(\frac{V_S}{V_n}\right).$$

In one embodiment, $\vec{V}_{ref}$ is the reference vector of Space Vector Modulation (SVM) in motor control.

$\vec{\Psi}_s$ represents stator flux linkage space vector and $\vec{\Psi}_s = L \vec{I}$. It points in the same direction as the stator current space vector $\vec{I}$.

$\vec{\Psi}_r$ represents rotor flux linkage space vector with magnitude $|\Psi_r|$. $|\Psi_r|$ can be derived from the voltage constant, speed constant or torque constant in motor specifications as it will show below that the BEMF magnitude is $|\omega_r \Psi_r|$.

$R\vec{I}$ represents resistive voltage drop space vector due to current flowing through the stator windings.

$$\frac{d\vec{\Psi}_s}{dt}$$

represents electromotive force space vector induced by time-varying stator flux linkage space vector.

$$\frac{d\vec{\Psi}_r}{dt}$$

represents BEMF space vector with magnitude of $|\omega_r \Psi_r|$, it is the electromotive force induced by time-varying rotor flux linkage space vector and always perpendicular to it.

φ represents electrical angular position of rotor, it is simply called "rotor position" in this document.

γ represents electrical angular position of the stator current space vector.

θ represents electrical angular position of the stator voltage space vector.

$\omega_i$ represents electrical angular speed of stator current space vector, and $$\omega_i = \frac{d\gamma}{dt}.$$

$\omega_r$ represents electrical angular speed of rotor, and $$\omega_r = \frac{d\varphi}{dt}.$$

It is simply called "rotor speed" in this document. The motor mechanical speed is $\omega_r$ divided by the pole-pair number of motor.

e represents Euler's number (i.e.: the base of the natural logarithm), and e≈2.718281828.

j represents an imaginary unit, and $j^2=-1$. Also note that $e^{j\pi/2}=j$.

π represents Archimedes' constant (i.e.: the ratio of a circle's circumference to its diameter), and π≈3.14159265359.

where:

In Equation (2), with the exception of two unknown variables such as rotor speed $\omega_r$ and rotor position φ, all other elements are either constants (i.e.: e, j, π/2), motor parameters (i.e.: R, L and $|\Psi_r|$), measured and/or calculated values (i.e.: |I|, γ, $$\frac{d|i|}{dt},$$

$\omega_i$, $|V_{ref}|$ and θ).

Figure 7:
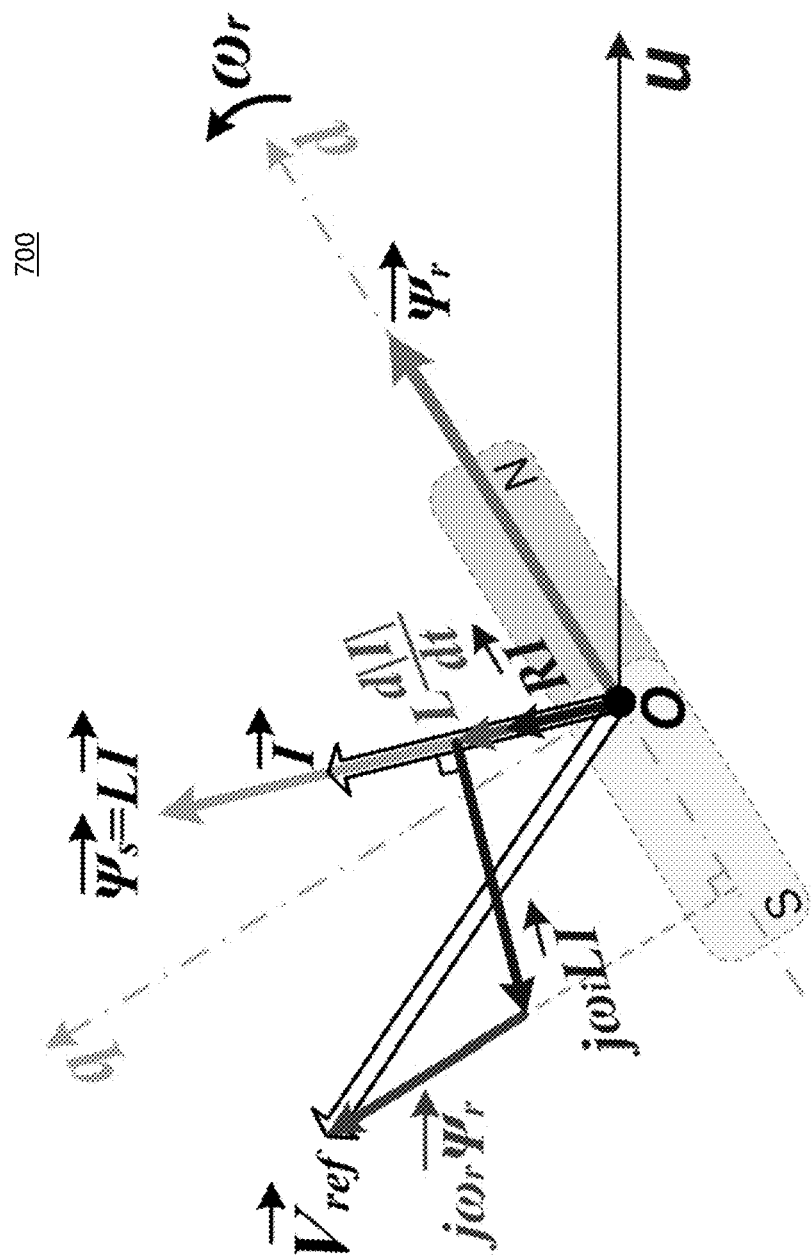
FIG. 7 is an example diagram illustrating implementation of a space vector diagram for a general case according to embodiments herein.
Figure 8:
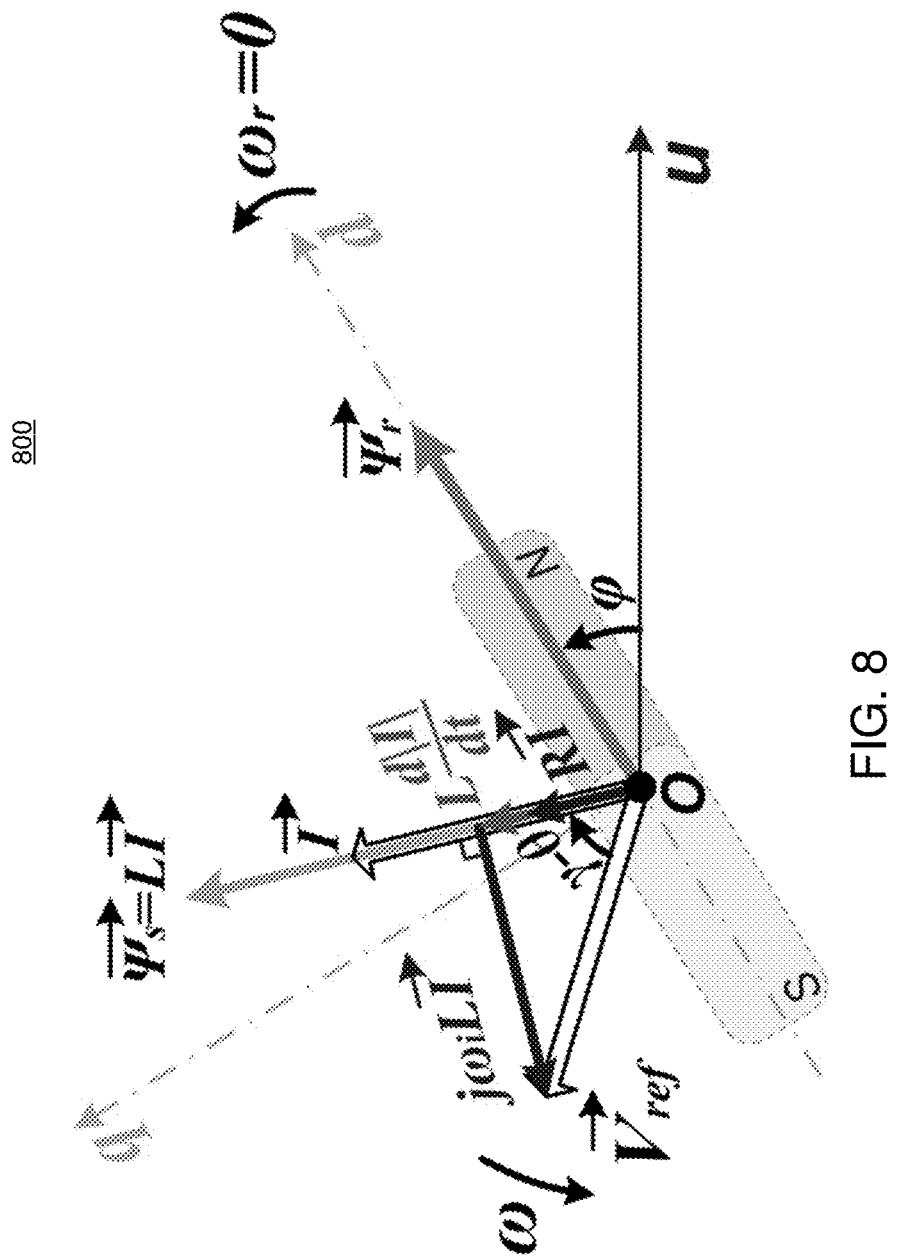
FIG. 8 is an example diagram illustrating implementation of a space vector diagram for a standstill or slow motor rotor speed according to embodiments herein.

In one embodiment, the space vector diagram 700 associated with equation 2 and corresponding space vector modulation model 217 is shown in FIG. 7 for general cases. In accordance with another embodiment, the space vector diagram 800 associated with equation 2 and corresponding space vector modulation model 217 is shown in FIG. 8 for special cases in which the rotor (rotor 139) is standstill (not rotating) or rotating at low rotor speed.

Figure 9:
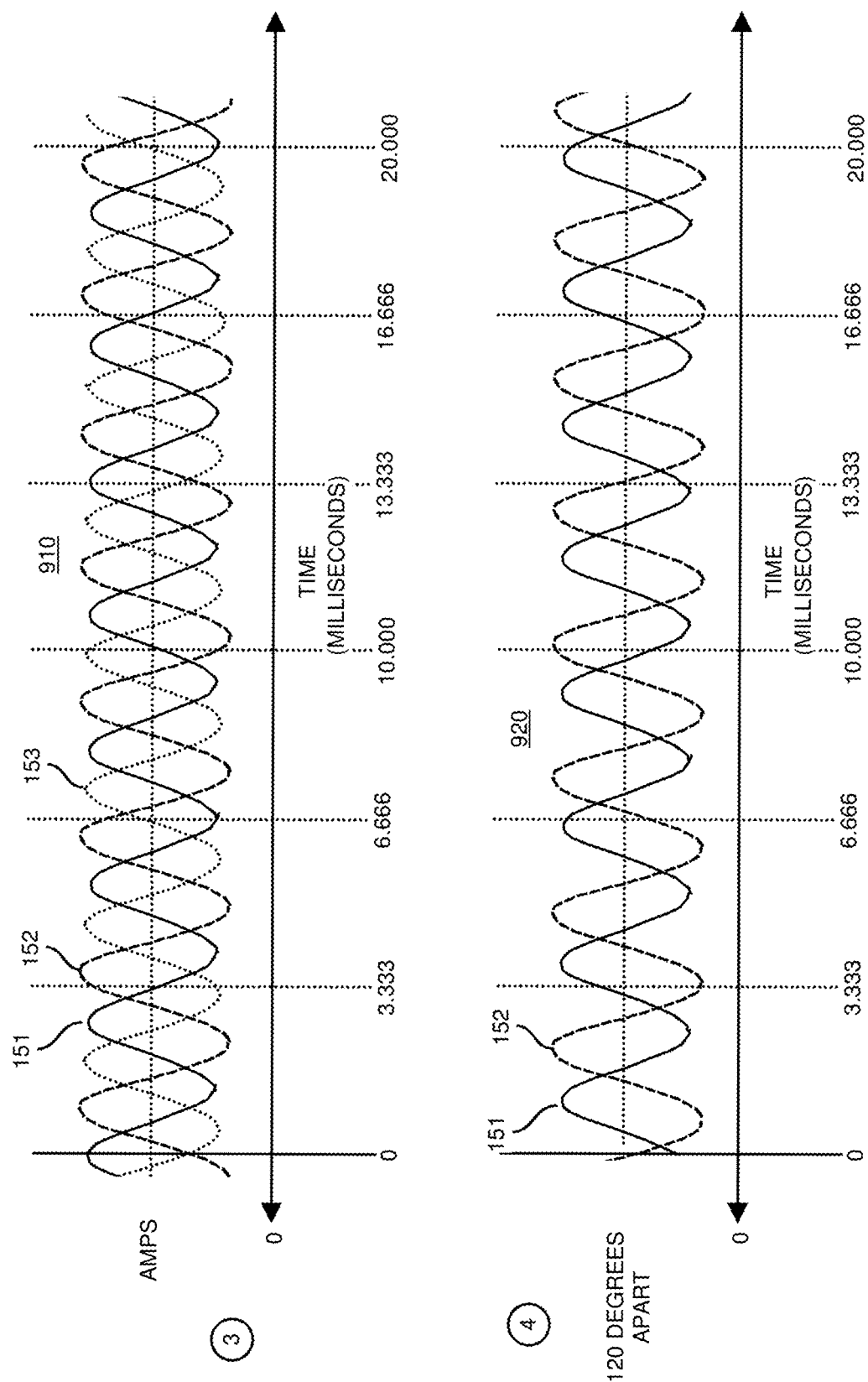
FIG. 9 is an example of timing diagrams illustrating monitoring current through multiple motor windings according to embodiments herein.

FIG. 9 is an example diagram illustrating monitored current according to embodiments herein.

For example, graph 910 illustrates the magnitude of signals 151, 152, and 153 produced by the current monitor 150. As previously discussed, signal 151 represents a magnitude of current 131-1 supplied to winding 131; signal 152 represents a magnitude of current 132-1 supplied to winding 132; signal 153 represents a magnitude of current 133-1 supplied to winding 133.

The current calculation unit 230 choses two of the three signals for further processing to determine position information associated with the motor 130. For example, the current calculation unit 230 output signals 151 and 152 to the transform module 235. In graph 920, the signals 151 and 152 are offset by 120 degrees with respect to each other.

Figure 10:
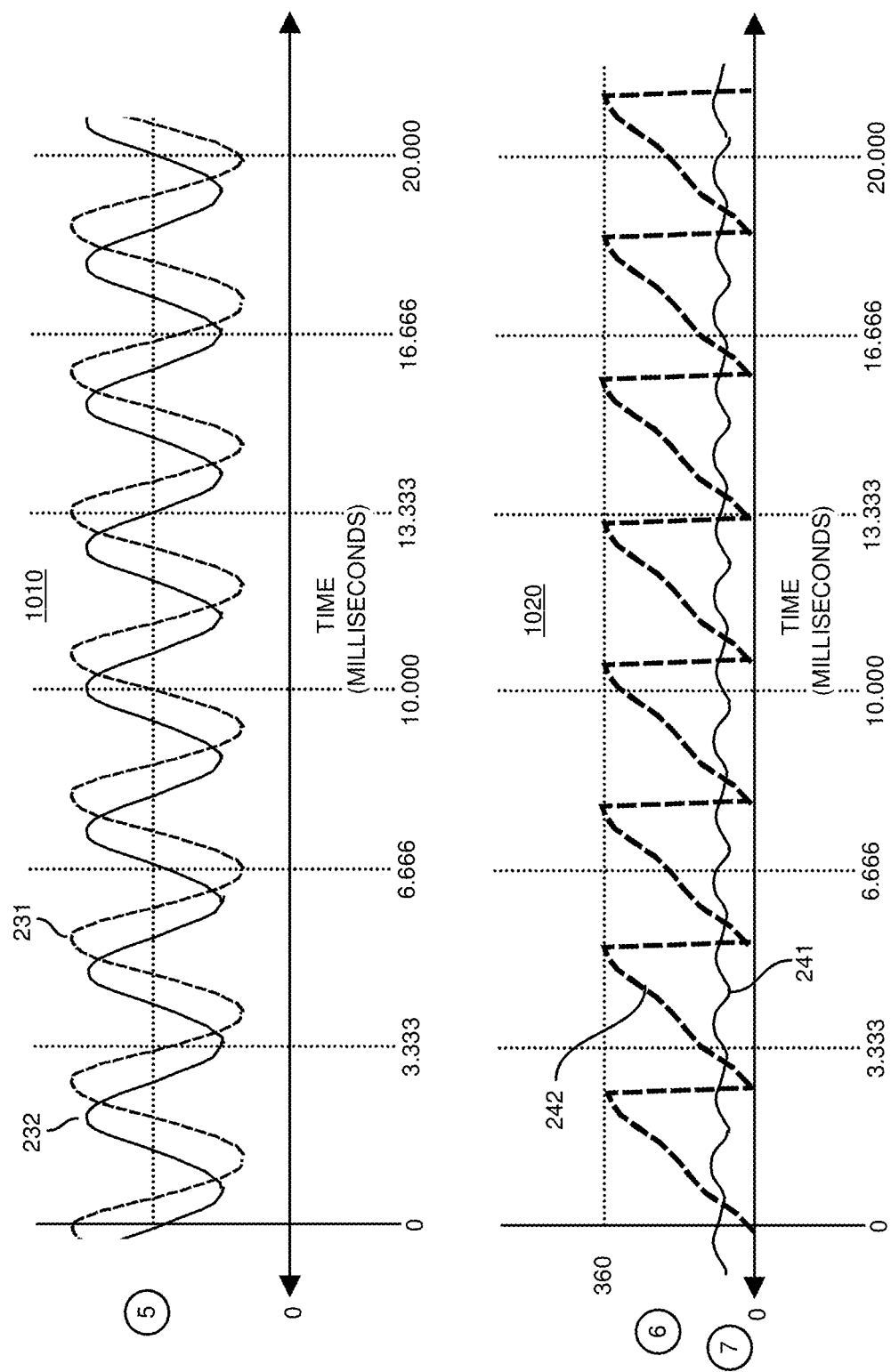
FIG. 10 is an example timing diagrams illustrating conversion of motor phase current using multiple transforms according to embodiments herein.

FIG. 10 is an example timing diagrams illustrating conversion of motor phase current using multiple transforms according to embodiments herein.

In this example embodiment, the controller 140 (via module 235 and module 240) applies one or more transformation functions to convert the monitored magnitude of the current 151 and 152 through the windings 131 and 132 of the motor 130 into signals 231 and 232 in graph 1010.

In one embodiment, module 235 applies a Clarke transformation to the received signals 151 and 152 to produce signals 231 and 232 (which are out of phase with respect to each other by 90 degrees instead of 120 degrees).

The module 240 receives the signals 231 and 232 and converts them into signals 241 and 242 as shown in graph 1020. In one embodiment, the module 240 applies a Cartesian to Polar coordinates transformation to convert the signals 231 and 232 into signals 241 and 242.

Figure 11:
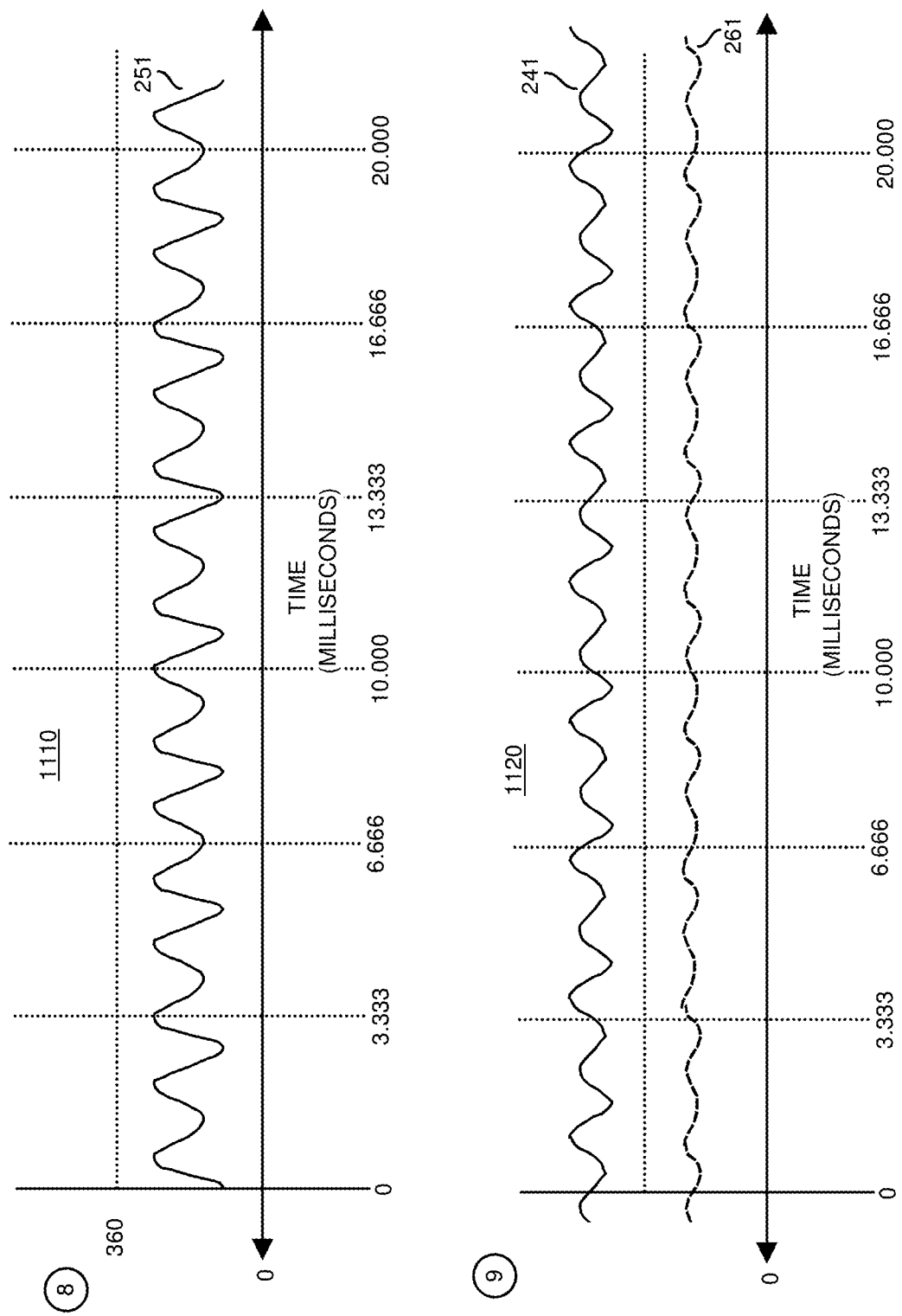
FIG. 11 is an example of timing diagrams illustrating multiple waveforms according to embodiments herein.

FIG. 11 is an example of timing diagrams illustrating multiple waveforms according to embodiments herein.

Graph 1110 illustrates signal 251 produced by the summer 267. Signal 251 is a difference between signal 242 and signal 209.

Graph 1120 illustrates signal 261 produced by the module 245. As previously discussed, signal 261 is equal to Vref times SIN(signal 242–signal 209), which is also known as Vref times SIN(gamma–theta).

Figure 12:
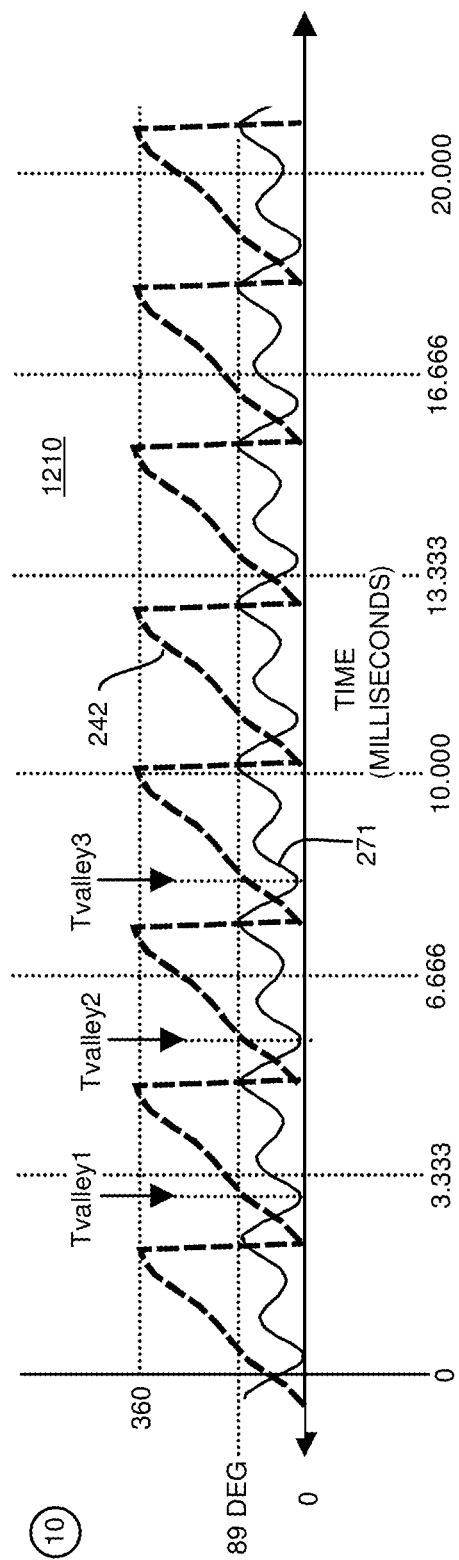
FIG. 12 is an example diagram illustrating mapping of a valley of an inductance waveform to a respective angular position associated with a motor rotor according to embodiments herein.

FIG. 12 is an example diagram illustrating mapping of a valley of an inductance waveform to a respective position angle according to embodiments herein.

Signal 271 in graph 1210 shows a typical inductive reactance (or inductance) of stator winding associated with the motor 130 versus rotor angle electrical angle as ω is a constant during the initial rotor position detection. The standstill rotor (rotor 139) angle is determined when the value of the inductive reactance (or inductance) of signal 271 or $X_L$ is minimum such as at time Tvalley1.

In one embodiment, the module 255 searches for minimum values Tvalley1 and other valleys of signal 271 through all measured values of inductive reactance (or inductance), and calculates the rotor position phi value 165 based on mapping the minimum valley to a corresponding angle of signal 242. In this example embodiment, the minimum at time Tvalley1 maps to an angle of 89 degrees. In such an instance, the position detector 160 indicates that the initial angle is 89 degrees.

In one embodiment, when starting the motor and corresponding rotor from a stationary or slow rotation condition, the controller 140 uses this initial position information to select an appropriate phase of subsequent supply currents to drive each of the windings to achieve maximum torque at startup.

Thus, a magnitude of the inductance function (such as signal 271) generated by the controller 140 varies over time. In one embodiment, the module 255 of the controller 140 identifies (calculates) the position of the rotor 139 based on a minimum inductance value of the generated inductance function (such as signal 271) at time Tvalley1 and other valley times Tvalley2, Tvalley3, etc.

Thus, the controller 140 derives an inductance value or inductance function (signal 271) that varies in magnitude over time and which is derived based on the measured magnitude of current 131-1, 132-1, and 133-1 (such as test current to determine rotor position) supplied through the windings as indicated by the signals 151, 152, and 153. The position detector 160 of the controller 140 determines the position of the rotor 139 based on the magnitude of the inductance value or inductance reactance value (at a minimum) in a given control cycle of supplying the test current through the motor windings 131, 132, and 133.

Figure 13:
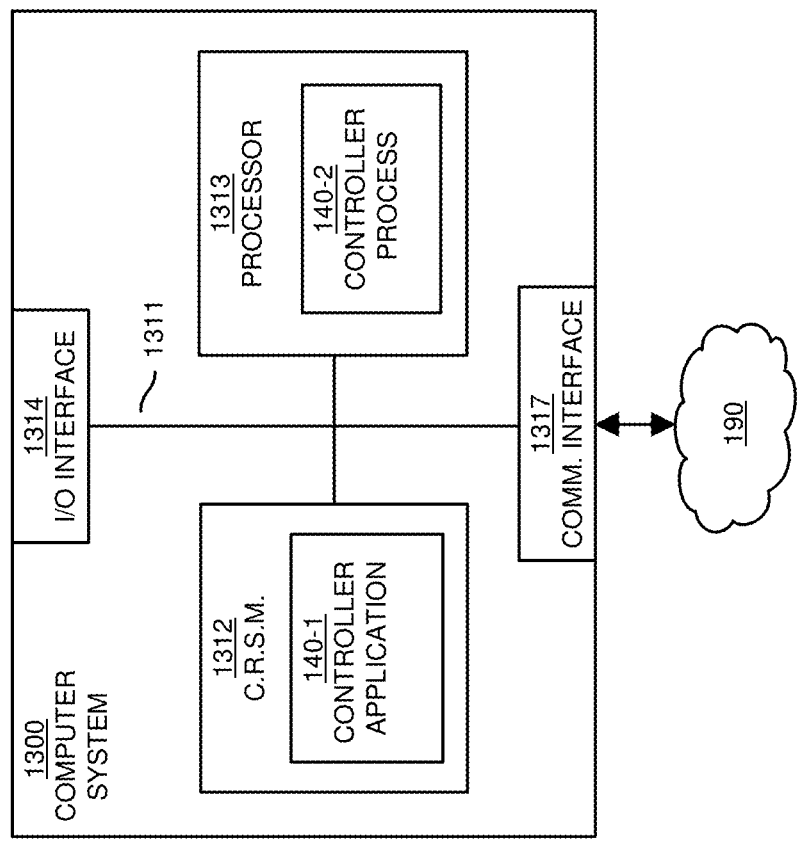
FIG. 13 is an example diagram illustrating computer processor hardware and related software instructions that execute methods according to embodiments herein.

FIG. 13 is an example block diagram of a computer device for implementing any of the operations as discussed herein according to embodiments herein.

As shown, computer system 1300 (such as implemented by any of one or more resources such as excitation signal generator 120, the signal generator 130, position detector 160, controller 140, current monitor 150, etc.) of the present example includes an interconnect 1311 that couples computer readable storage media 1312 such as a non-transitory type of media (or hardware storage media) in which digital information can be stored and retrieved, a processor 1313 (e.g., computer processor hardware such as one or more processor devices), I/O interface 1314, and a communications interface 1317.

I/O interface 1314 provides connectivity to any suitable circuitry or component such as user interface 115, winding 131, motor 130, drivers, current monitor 150, etc.

Computer readable storage medium 1312 can be any hardware storage resource or device such as memory, optical storage, hard drive, floppy disk, etc. In one embodiment, the computer readable storage medium 1312 stores instructions and/or data used by the controller application 140-1 to perform any of the operations as described herein.

Further in this example embodiment, communications interface 1317 enables the computer system 1300 and processor 1313 to communicate over a resource such as network 190 to retrieve information from remote sources and communicate with other computers.

As shown, computer readable storage media 1312 is encoded with controller application 140-1 (e.g., software, firmware, etc.) executed by processor 1313. Controller application 140-1 can be configured to include instructions to implement any of the operations as discussed herein.

During operation of one embodiment, processor 1313 accesses computer readable storage media 1312 via the use of interconnect 1311 in order to launch, run, execute, interpret or otherwise perform the instructions in controller application 140-1 stored on computer readable storage medium 1312.

Execution of the controller application 140-1 produces processing functionality such as controller process 140-2 in processor 1313. In other words, the controller process 140-2 associated with processor 1313 represents one or more aspects of executing controller application 140-1 within or upon the processor 1313 in the computer system 1300.

In accordance with different embodiments, note that computer system 1300 can be a micro-controller device, logic, hardware processor, hybrid analog/digital circuitry, etc., configured to control a power supply and perform any of the operations as described herein.

Functionality supported by the different resources will now be discussed via flowchart 1400 in FIG. 14. Note that the steps in the flowcharts below can be executed in any suitable order.

Figure 14:
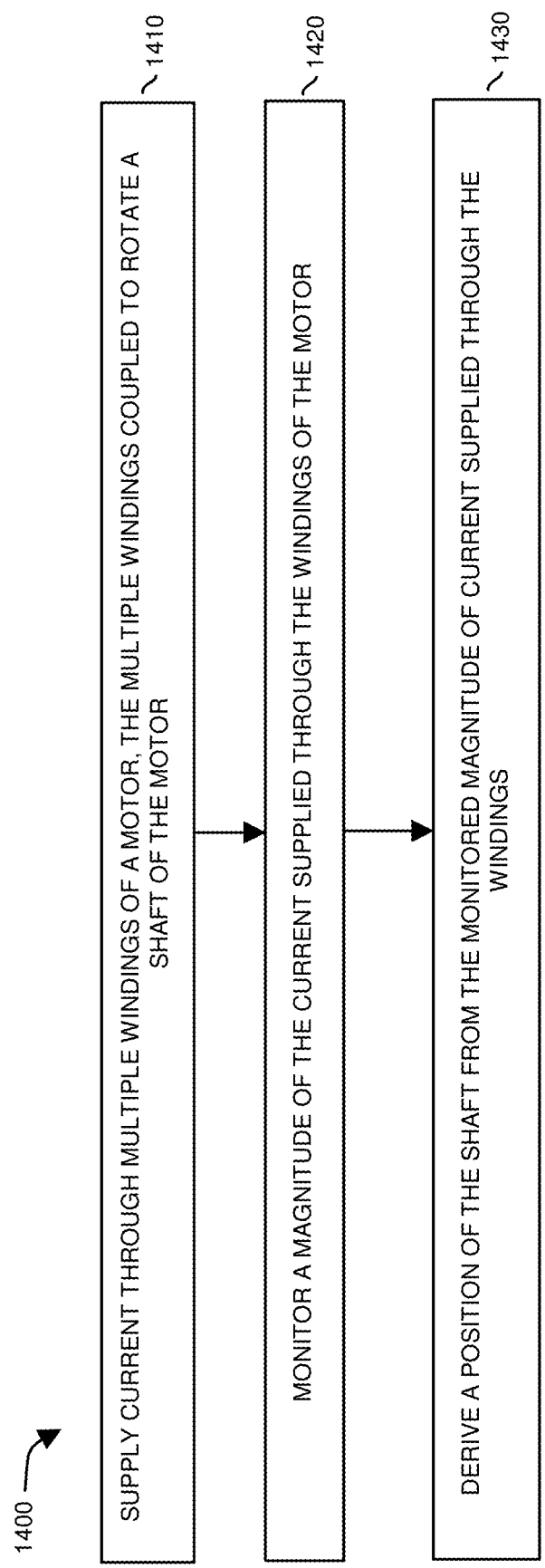
FIG. 14 is an example diagram illustrating a method according to embodiments herein.

FIG. 14 is an example diagram illustrating a method of controlling a power converter according to embodiments herein.

In processing operation 1410, the controller 140 supplies current through multiple windings of a motor. The multiple windings are operative to rotate a rotor of the motor.

In processing operation 1420, the controller 140 monitors a magnitude of the current supplied through the windings of the motor 130.

In processing operation 1430, the controller 140 derives a position of the rotor 139 from the monitored magnitude of current supplied through the windings.

Figure 15:
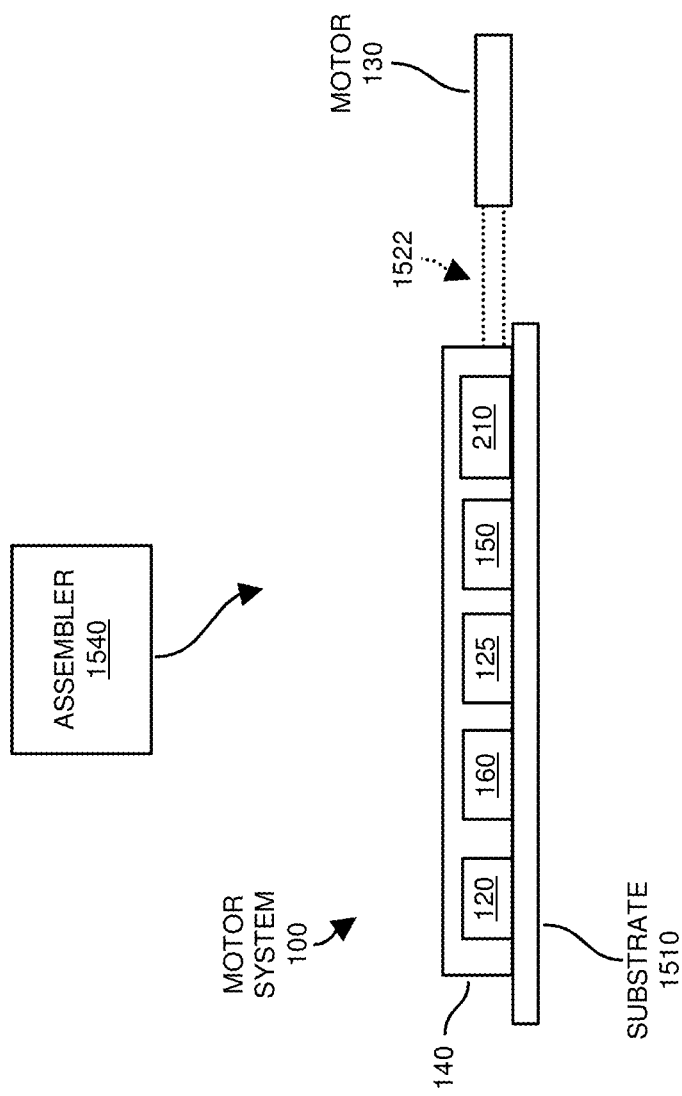
FIG. 15 is an example diagram illustrating assembly of a circuit according to embodiments herein.

FIG. 15 is an example diagram illustrating assembly of a control system (such as a circuit) according to embodiments herein.

In this example embodiment, assembler 1540 receives a substrate 1510 and corresponding components of system 100 such as one or more of controller 140, and corresponding components. The assembler 1540 affixes (couples) the controller 140 and other components such as excitation signal generator 120, drive signal generator 125, position detector 160, current monitor 150, inverter 210, etc., to the substrate 1510.

Via one or more respective circuit paths (such as traces, cables, wiring, etc.) as described herein, the fabricator 1540 provides connectivity between one or more components associated with the controller 140. Note further that components such as the controller 140 and corresponding components can be affixed or coupled to the substrate 1510 in any suitable manner. For example, one or more of the components in motor system 100 and/or controller 140 can be soldered to the substrate 1510, inserted into sockets disposed on the substrate 1510, etc.

Additionally, in one embodiment, the substrate 1510 is optional. Any of one or more circuit paths or connectivity as shown in the above drawings and as described herein can be disposed in cables, flexible substrates, or other suitable media.

In one nonlimiting example embodiment, the motor 130 (such as including one or more windings) is disposed on its own assembly independent of substrate 1510; the substrate of the load (such as motor) is directly or indirectly connected to the substrate 1510 via wires, cables, links, etc. The controller 140 or any portion of the motor system 100 can be disposed on a standalone smaller board plugged into a socket of the substrate 1510 as well.

As previously discussed, via one or more circuit paths 1522 (such as one or more traces, cables, connectors, wires, conductors, electrically conductive paths, etc.), the assembler 1540 couples the system 100 and corresponding components to the winding 131. In one embodiment, the circuit path 1522 conveys current from an input voltage (supply voltage) to the motor 130 and corresponding windings.

Accordingly, embodiments herein include a system comprising: a substrate 1510 (such as a circuit board, standalone board, mother board, standalone board destined to be coupled to a mother board, host, etc.); a system 100 including corresponding components as described herein; and at least one winding (such as a motor, winding, etc.).

Note again that techniques herein are well suited for use in determining a position of a respective motor. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a controller operative to:
supply current through multiple windings of a motor;
monitor a magnitude of the current supplied through the multiple windings of the motor; and
based on inductance determined from the monitored magnitude of current supplied through the multiple windings, determine a position of a rotor of the motor.

2. The apparatus as in claim 1, wherein the current is test current; and
wherein the controller is operative to supply the test current through the multiple windings and determine the position of the rotor while the rotor of the motor is not rotating.

3. The apparatus as in claim 1, wherein the current supplied through the multiple windings of the motor does not cause the rotor of the motor to rotate.

4. The apparatus as in claim 1, wherein the controller is operative to supply the current, monitor the magnitude, and determine the position of the rotor while a speed of rotating the rotor is above zero and below a threshold value.

5. The apparatus as in claim 1, wherein a frequency of the current supplied through the multiple windings is greater than a rotational frequency of the rotor.

6. The apparatus as in claim 1, wherein the controller is operative to control supply of the current through the multiple windings of the motor based on space vector modulation.

7. The apparatus as in claim 1, wherein the controller is further operative to:
via a transformation function, convert the monitored magnitude of the current through the multiple windings of the motor into an inductance function, a magnitude of the inductance function varying over time.

8. The apparatus as in claim 7, wherein the controller is further operative to identify the position of the rotor based on a minimum identified inductance value.

9. The apparatus as in claim 7, wherein the transformation function includes a Clarke transformation and a Cartesian to Polar coordinates transformation.

10. The apparatus as in claim 1, wherein the controller is further operative to:
derive an inductance value that varies over time based on the magnitude of current supplied through the windings; and
determine the position of the rotor based on the magnitude of the inductance value in a given control cycle of supplying the current through the multiple windings.

11. The method as in claim 1 further comprising:
controlling sinusoidal supply of the current through multiple windings of the motor based on space vector modulation.

12. A system comprising:
a circuit substrate; and
the apparatus of claim 1 coupled to the circuit substrate.

13. A method comprising:
receiving a circuit substrate; and
coupling the apparatus of claim 1 to the circuit substrate.

14. The apparatus as in claim 1, wherein the motor is a brushless DC motor.

15. The apparatus as in claim 1, wherein the controller is further operative to:
measure the magnitude of the current supplied through the multiple windings of the motor; and
derive the inductance from the measured magnitude of the current.

16. The apparatus as in claim 1, wherein the controller is further operative to:
derive an inductance value that varies over time based on the magnitude of current supplied through the multiple windings.

17. The apparatus as in claim 16, wherein the controller is further operative to:
determine the position of the rotor based on the magnitude of the inductance value.

18. The apparatus as in claim 1, wherein the controller is further operative to:
determine the position of the rotor within a period of a control cycle of supplying the current through the multiple windings of the motor.

19. The apparatus as in claim 1, wherein a magnitude of the inductance varies depending on the position of the rotor.

20. The apparatus as in claim 19, wherein the magnitude of the inductance corresponds to the position of the rotor.

21. The apparatus as in claim 1, wherein the controller is further operative to:
calculate the inductance based on the magnitude of current;
identify a valley of the inductance; and
derive the position of the rotor via mapping of the valley to an angle value indicative of the position.

22. The apparatus as in claim 21, wherein the controller is further operative to:
use the derived position of the rotor to select an appropriate phase of subsequent supply current to drive the multiple windings to achieve a desired torque associated with the rotor.

23. A method comprising:
supplying current through multiple windings of a motor;
monitoring a magnitude of the current supplied through the multiple windings of the motor; and
based on inductance determined from the monitored magnitude of current supplied through the multiple windings, derive a position of a rotor of the motor.

24. The method as in claim 23 further comprising:
supplying the current through the multiple windings; and
determining the position of the rotor while the rotor of the motor is not rotating.

25. The method as in claim 23, wherein the current supplied through the multiple windings of the motor does not cause the rotor of the motor to rotate.

26. The method as in claim 23 further comprising:
supplying the current, monitoring the magnitude, and determining the position while a speed of rotating the rotor is greater than zero but below a threshold value.

27. The method as in claim 23, wherein a frequency of the current supplied through the multiple windings is greater than a rotational frequency of the rotor.

28. The method as in claim 23 further comprising:
converting the monitored magnitude of the current through the multiple windings of the motor into an inductance signal, a magnitude of the inductance signal varying over time.

29. The method as in claim 28 further comprising:
identifying the position of the rotor based on a minimum inductance value of the inductance signal derived from the monitored magnitude of current through the windings.

30. The method as in claim 28, wherein generation of the inductance signal includes application of a Clarke transformation function and a Cartesian to Polar coordinates transformation function.

31. The apparatus as in claim 23 further comprising:
deriving an inductance value that varies over time based on the magnitude of current supplied through the windings; and
determining the position of the rotor based on the magnitude of the inductance value in a given control cycle of supplying the current through the windings.

32. Computer-readable storage media having instructions stored thereon, the instructions, when executed by computer processor hardware, cause the computer processor hardware to:
supply test current through multiple windings of a motor;
monitor a magnitude of the test current supplied through the multiple windings of the motor; and
based on inductance determined from the monitored magnitude of test current supplied through the multiple windings, determine a position of a rotor of the motor.

* * * * *